United States Patent

Edwards et al.

[11] Patent Number: 5,819,029
[45] Date of Patent: Oct. 6, 1998

[54] THIRD PARTY VERIFICATION SYSTEM AND METHOD

[75] Inventors: Jim G. Edwards; Robert W. Taylor, both of Houston; William J. Hokanson, Pearland; Lynn A. Evans, Houston; Patricia A. Middleton, Houston; Frederick G. Lauckner, Houston; Andres E. Martinez, Houston; Edmond Jacobs, Houston, all of Tex.

[73] Assignee: Brittan Communications International Corp., Houston, Tex.

[21] Appl. No.: 803,409

[22] Filed: Feb. 20, 1997

[51] Int. Cl.$^6$ ............................ G06F 11/00; H04M 11/10
[52] U.S. Cl. .............................................. 395/186; 379/69
[58] Field of Search ............................... 395/186, 187.01, 395/188.01, 200.59; 340/870.03, 825.34; 705/12, 14, 24, 34, 44, 405; 707/104; 379/67, 68, 69, 85, 88, 89, 154

[56] References Cited

U.S. PATENT DOCUMENTS

| | | | |
|---|---|---|---|
| 5,303,296 | 4/1994 | Zucker ........................................ | 379/67 |
| 5,341,414 | 8/1994 | Popke ........................................ | 379/142 |
| 5,533,103 | 7/1996 | Peavey et al. .............................. | 379/69 |
| 5,544,230 | 8/1996 | Megyesi ..................................... | 379/67 |
| 5,559,867 | 9/1996 | Langsenkamp et al. ................. | 379/69 |
| 5,638,430 | 6/1997 | Hogan et al. ............................. | 379/112 |

*Primary Examiner*—Joseph Palys
*Attorney, Agent, or Firm*—David Newman Chartered

[57] ABSTRACT

An automated third party verification system and method for verifying a customer's authorization to switch long distance service providers. The system broadly comprises a customer database manager, a third party verification (TPV) interactive voice response (IVR) system, and a TPV management system. The customer database manager contacts the customer and, responsive to the customer's authorization to switch long distance carriers, creates a text file of the customer's responses to a series of questions supporting the authorization. The text file is sent to the TPV IVR system. The TPV IVR system directs a series of scripted questions, corresponding to those already asked by the customer database manager, to the customer and records the responses as voice clips. The TPV management system presents the voice clips and the corresponding text file to a verifier through a voice data verification module. Verifications made by the verifier through the voice data verification module are monitored by a quality assurance processor within the TPV management system. The quality assurance processor targets suspect verifications and accelerates the input of test entries to the voice data verification module to confirm invalid verifications. Final verification status, when determined, is sent by the quality assurance processor to the customer database manager.

25 Claims, 3 Drawing Sheets

THIRD PARTY VERIFICATION SYSTEM AND METHOD

BACKGROUND OF THE INVENTION

This invention relates to verification of a transaction, either by a third party or in-house, and more particularly to third party verification of a customer's authorization to take a specified action, such as to change the customer's local, long distance, or other communications carrier.

DESCRIPTION OF RELATED ART

Since the entry of competition into the telephone service industry, the number of competing long distance carriers has steadily increased to well over 700 as new long distance providers enter the market. A common means of encouraging potential customers to switch long distance service is telemarketing. A telemarketer working for a service provider contacts a potential customer and, if successful in obtaining the customer's authorization, initiates transfer of the customer's long distance service to the service provider represented by the telemarketer.

A problem aries when the customer's long distance service is switched and the customer denies ever having given the authorization for such a switch. To mitigate this problem, the customer's purported authorization is verified by a third party. Most third party verification processes today depend on live operators to perform such third party verification by placing a later second telephone call to the new customer. These live operators ask the customer a series of questions mirroring those questions already asked by the telemarketer. A major drawback with conventional verification is the inability to have simultaneous verification, thereby closing the sale in one call. Telemarketing sales are difficult enough because often multiple attempts are made to reach a prospective customer. A system that requires a later, second call to the same customer has the same problem of catching the customer at home, thereby causing delays in processing a customer's order or being unable to verify the transaction altogether.

Another drawback to conventional verification techniques is that they are expensive, due to the large number of verifiers required and the time necessary to ask each question and hear its response. The direct cost of telemarketing sales can, in effect, double. Another drawback is that live verification is a process prone to the same errors as can occur with telemarketers. For example, the live operators may, through fatigue or disinterest, fail to accurately listen to the customer. Also, for whatever reason, telemarketers or a single live operator can intentionally represent that a sale or verification occurred when, in fact, it did not. Conventional verification is problematic because one individual has complete power to verify a transaction, just as the telemarketer has complete power to represent that a sale occurred. One way of reducing this problem would be to use two or more live operators working as a committee to verify each telemarketing sale in a single verification call. This is an unrealistic solution because the cost of telemarketing sales would double or triple again. With the present invention, the possibility of collusion among the verifiers to verify calls they should not has been eliminated.

The present invention, through automation of customer response recording, combined with quality assurance monitoring of verifications output by a verifier, addresses these problems and presents a third party verification system and method having a reduced incidence of error and lowered verification costs.

SUMMARY OF THE INVENTION

A general object of the invention is automation of third party verification for increased accuracy and lower cost.

Another object of the invention is increased reliability of third party verification through random, pseudo-random, periodic or verifier-directed insertion of test entries for verifier monitoring and testing.

An additional object of the invention is increased accuracy in third party verification through the optional use of multiple verifiers for each customer authorization and/or for each customer response.

Another object of the invention is certainty as to the telephone number dialed by the telemarketer because with simultaneous or virtually simultaneous third party verification, the verifier does not dial the customer's telephone number himself.

A further object of the invention is reduced occurrence of unauthorized long distance company switches and, as a result, fewer customer complaints.

According to the present invention, as embodied and broadly described herein, a third party verification system for verifying a customer's authorization to a service provider to perform a specified act is provided. The system broadly comprises a customer database manager, a third party verification (TPV) interactive voice response (IVR) system, and a TPV management system. The customer database manager has a telemarketing user interface for contacting a customer at a telephone number and initiating a series of questions and/or confirming data already on file. A telemarketer at the telemarketing user interface, responsive to answers provided by the customer, creates a text file of the response information and initiates third party verification of the response information.

The TPV IVR system, coupled to the telemarketing user interface through a first communications channel and a second communications channel, receives the text file over the first communications channel and sends an automated plurality of scripted queries over the second communications channel to the customer. The TPV IVR system records a plurality of responses to the plurality of scripted queries as a plurality of voice clips.

The TPV management system, coupled to the TPV IVR system, includes a controller, a voice data verification module, and a quality assurance processor. The voice data verification module processes the plurality of voice clips with the text file to verify a match between the plurality of voice clips and respective response information within the text file. The quality assurance processor, coupled to the voice data verification module, monitors preliminary verification output by the voice data verification module and transmits final verification status to the customer database manager.

The present invention also provides a method for verifying a customer's authorization to a service provider to take a specified action using a third party verification system. The third party verification system includes a customer database manager having a telemarketing user interface, a TPV IVR system, and a TPV management system. The TPV management system includes a controller, a voice data verification module, and a quality assurance processor.

The method comprises the steps of initiating, by a telemarketer using the telemarketing user interface, a telephone contact with the customer to request authorization to take a specified action. If the customer authorizes the specified action, the telemarketer directs a plurality of queries to the customer. In response to the plurality of queries, the customer provides a first plurality of responses. Alternatively, the telemarketer may already have response information on file, in which case the telemarketer confirms the file information as a first plurality of responses. The telemarketer then generates a text file with the first plurality of responses, and establishes a communications link with the TPV IVR system.

The method further comprises the steps of transmitting the text file from the telemarketing user interface to the TPV IVR system. The TPV IVR system directs a plurality of scripted queries to the customer. The plurality of scripted queries corresponds to the plurality of queries, respectively. The customer, responsive to the plurality of scripted queries, provides a second plurality of responses to the TPV IVR system. The TPV IVR system records the second plurality of responses as a plurality of voice clips stored as sound files.

The TPV management system controller correlates the first plurality of responses with the corresponding plurality of sound files to create a plurality of response/sound file pairs.

The TPV management system verifies the plurality of response/sound file pairs using the voice data verification module. The quality assurance processor monitors a plurality of preliminary verifications of the plurality of response/sound file pairs and transmits a final verification status of the customer's telephone authorization to the customer database manager.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
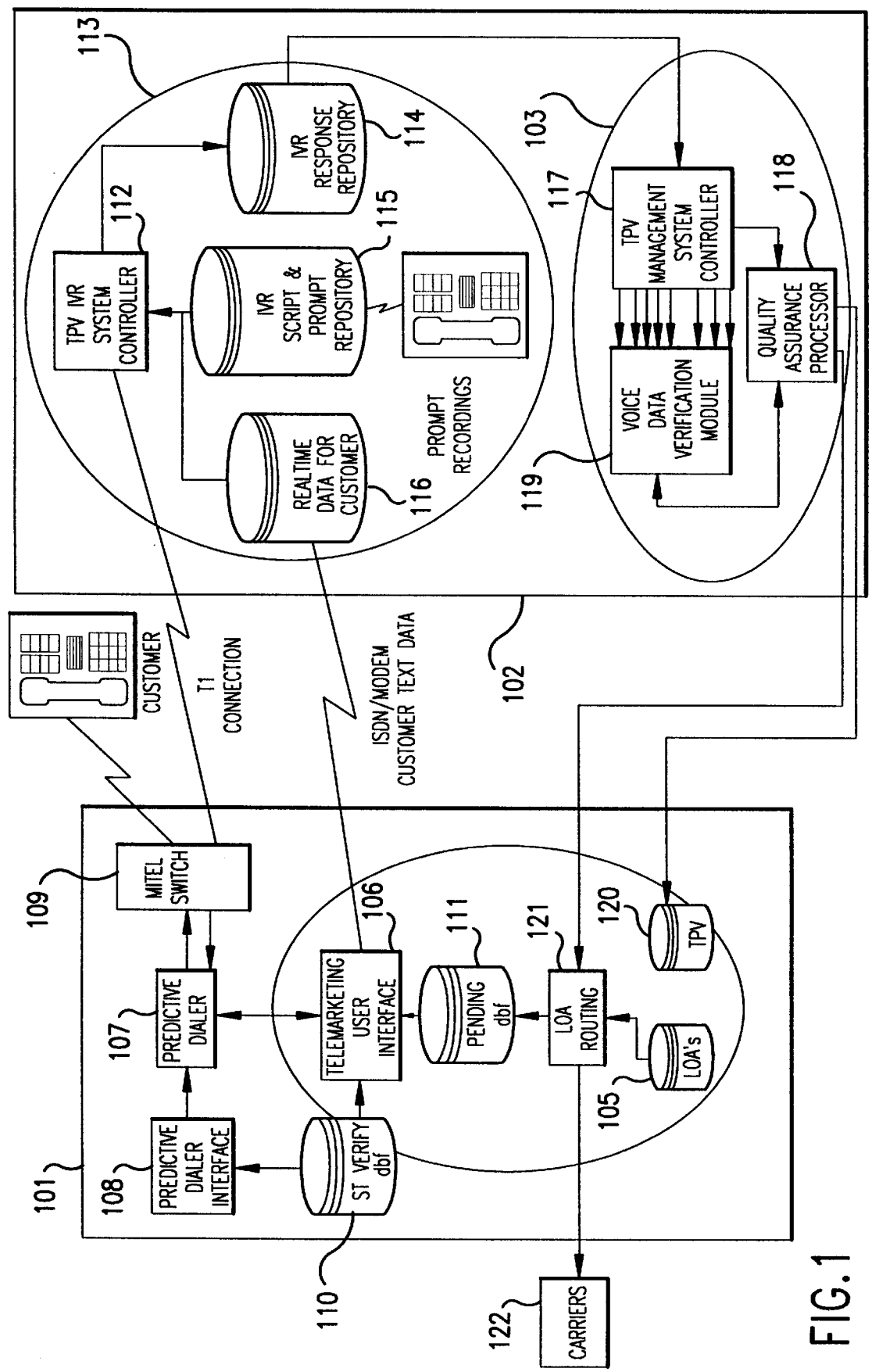
FIG. 1 is a block diagram of the major components of the third party verification system.

Reference now is made in detail to the present preferred embodiments of the invention, examples of which are illustrated in the accompanying drawings, wherein like reference numerals indicate like elements throughout the several views.

As illustratively shown in FIG. 1, the system of the present invention broadly comprises a customer database manager 101 and a third party verification unit 102. The third party verification unit 102 includes a third party verification (TPV) interactive voice response (IVR) system 113 and a third party verification management system 103. The third party verification (TPV) unit 102 may or may not be remotely located from the customer database manager 101. The TPV unit 102 may also be in-house to the customer database manager 101, with the customer database manager 101 and the TPV unit being managed and/or controlled by a common entity. This embodiment would be appropriate for those applications where verification is required or desired, but where verification does not have to be performed by a third party. As used in this patent, "third party verification" is understood to include in-house verification such that wherever a system is described herein as a TPV system, that description also applies to in-house verification systems employing the same system and method of the present invention as herein described.

The customer database manager 101 includes an LOA database 105 for handling letters of agency. Letters of agency (LOA's) are data entries that include basic information on potential customers and may include valid orders of service. Letters of agency may be distributed as part of a promotional effort in which a specified action is requested in conjunction with an entry form for the promotion. For example, as part of a contest, entry forms for a chance to win a specified prize may include an authorization to take the specified action. These LOA's are entered into the LOA database 105. Information put into the LOA database may also be derived from mailing lists, other databases of prospective customers, etc.

The customer database manager 101 also includes a telemarketing user interface 106 coupled to the LOA database 105. The telemarketing user interface 106 may include a predictive dialer 107 and a predictive dialer interface 108. The predictive dialer 107 is connected to the customer through a phone switch, embodied here as a Mitel switch 109. Any equivalent switch may be employed. Alternatively, the telemarketing user interface 106 may rely upon manual dialing.

The TPV IVR system 113 includes a TPV IVR controller 112 connected to a real-time customer information database 116, an interactive voice response (IVR) response repository 114, and an interactive voice response (IVR) script and prompt repository 115. The real-time customer information database 116 stores text files received from the telemarketing user interface 106. These text files are received over a first communications channel. The first communications channel may be embodied as an ISDN/modem link or any other connection suited for data transfer. The IVR script and prompt repository 115 stores the sequence of scripted queries and prompts that will be directed in an automated manner to the customer as part of the third party verification process. The IVR script and prompt repository is connected, through the TPV IVR controller, to the telemarketing user interface by a second communications channel. The second communications channel may be embodied as a T1 telephone link or other equivalent connection suitable for voice communication. The IVR response repository 114 stores the customer's responses to the scripted queries and prompts, received over the second communications channel, as a plurality of sound files. A sound file is defined herein as a file containing a telephone quality voice clip of the customer's response to a query. Sound files may be embodied as VOX files or in any other equivalent file format.

The third party verification (TPV) management system 103 within the third party verification unit 102 includes a controller 117, a voice data verification module 119, and a quality assurance processor 118. The voice data verification module 119 is used by a plurality of verifiers to verify responses received from the customer through the text files with those stored in the plurality of sound files. The quality assurance processor 118 is coupled to the controller 117 for monitoring preliminary verification status and results. The quality assurance processor 118 also has access to test entry generating means for generating test entries. Each test entry includes a non-matching response and sound file pairing. These test entries are inserted on a random, pseudorandom, periodic, or verifier-directed basis to the verifiers through the voice data verification module.

Figure 2:
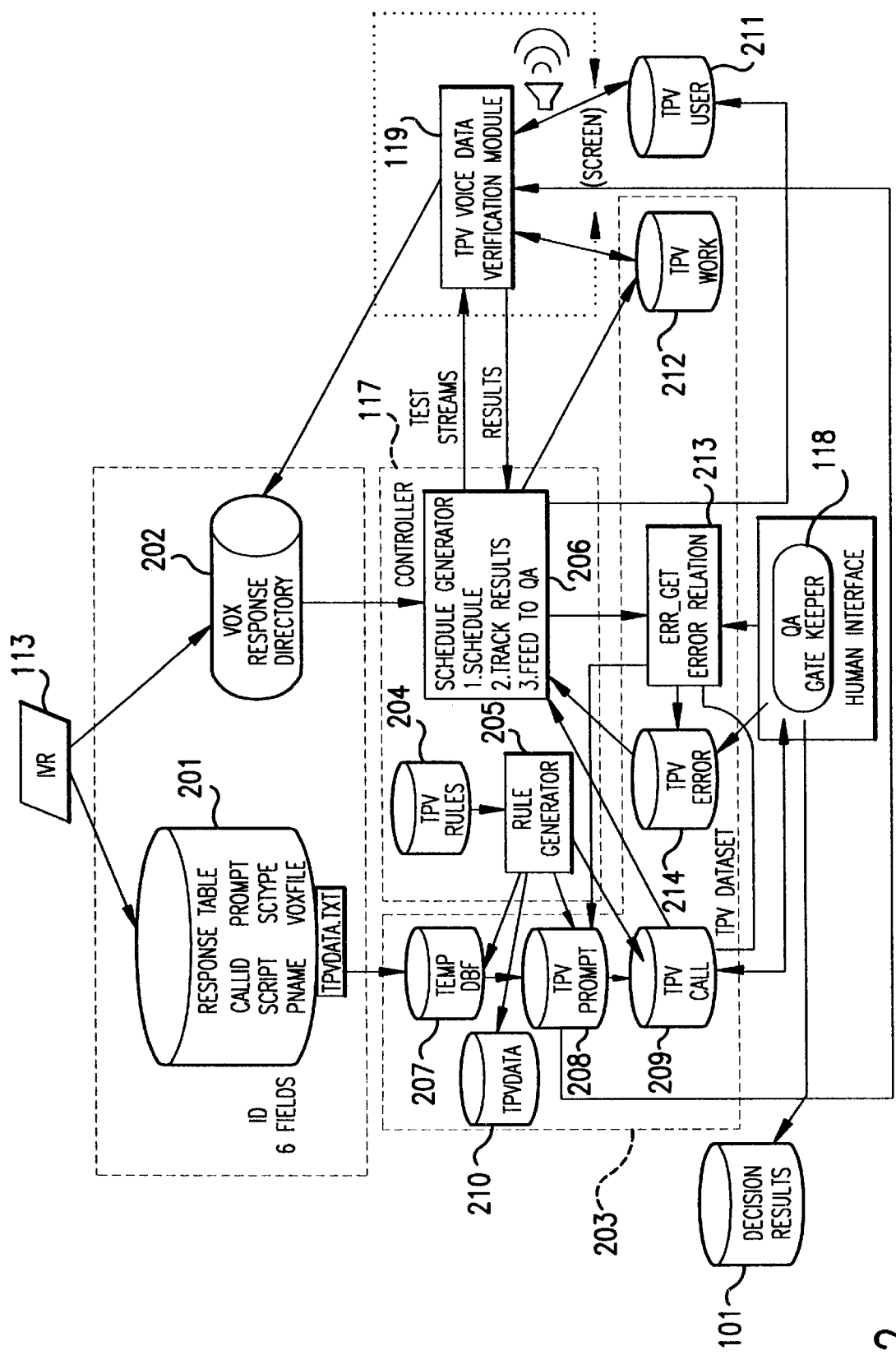
FIG. 2 is a block diagram of the third party verification management system.

The TPV management system 103 may be embodied as set forth in FIG. 2. The TPV management system includes a response file 201 and a sound file response directory. In the preferred embodiment the sound file response directory is embodied as a VOX file response directory 202. The response file 201 contains text files received from the telemarketing user interface 106. The VOX file response directory 202 stores the location of a plurality of sound files containing customer voice clip responses to the scripted queries and prompts.

Coupled to the VOX file response directory 202 is the controller 117. The controller 117 correlates the first plurality of responses with the corresponding plurality of sound files to generate a plurality of response/sound file pairs for verification. The controller 117 includes a schedule generator 206 and a rule generator 205. The rule generator 205 is coupled to and receives an input from a TPV rules file 204.

The rule generator 205 generates a set of rules to be used during a third party verification. This set of rules contains the parameters governing how the verification is conducted. Rules within the set may include, but are not limited to, specifications governing calls or prompts, groups of prompts, number of verifications, verification independence, time outs, number of positive preliminary verifications, and percentage of error.

A selection made between calls or prompts determines how entries to be verified are allocated to the verifiers. A "call" is defined to be that set of responses obtained from a customer during a telephone contact. This set of responses includes those answers provided to the telemarketing user interface and recorded as a text file; this same set of responses includes those answers provided to the TPV IVR system for recording and storage as a plurality of sound files. A "prompt" is defined as a particular question eliciting a single response within a call.

By selecting "calls," an entire call from a particular customer goes to a verifier. The call may go to more than one verifier, i.e., if number of verifications is set at three the entire call will be subjected to three verifications, but all of the prompts and responses within a customer's recorded set of responses go to each assigned verifier.

By selecting "prompts," the individual prompts within a customer's recorded set of responses are separated, with each response, responsive to one associated prompt, going alone to a verifier as an entry. The entry may go to more than one verifier for verification, but the customer's set of responses are not assigned as a group.

The groups of prompts rule enables a plurality of responses from a plurality of customers to be categorized by prompt, with each prompt category or group then assigned to a particular verifier. For example, each customer during a telephone contact may be asked, "What is your name?" and then "What is your address?" and then "What is your mother's maiden name?". These three questions constitute three groups of prompts. Using the groups of prompts rule, a first verifier may be assigned to verify only the customer's responses to the prompt, "What is your name?". A second verifier may be assigned to verify only the customer's responses to the prompt, "What is your address?". A third verifier may be assigned to verify only the customer's responses to the prompt, "What is your mother's maiden name?". Verifier assignments may be changed, as desired, using the groups of prompts rule so that the second verifier verifies the customer's responses to the prompt, "What is your name?" while the first verifier verifies the customer's responses to the prompt, "What is your address?", etc.

Number of verifications determines the number of verifications to which each call or prompt is subjected. For example, if the number of verifications is set at "5" and the calls nor prompts rule is set to "calls", each customer's responses, as a set, are sent to be verified five times. This rule does not dictate that there be one verification per verifier. As a result, one verifier may verify the same set of information multiple times. This is usually not a problem if the calls or prompts rule is set to "prompts" in that a particular verifier is less likely to recognize repeated information from a single prompt. When the calls or prompts rule is set to "calls," however, it may be desirable to specify independent verification.

Independent verification, if selected, results in each verification being performed by a different verifier. For example, with independent verification, if number of verifications is set at "5" and the calls or prompts rule is set to "calls", each customer's responses, as a set, are sent to five different verifiers. Care must be taken when selecting independent verification to ensure that the number of verifications specified does not exceed the number of available verifiers.

Time outs include call timeout, screen timeout, and call timeout as number of days.

Call timeout controls the length of time an individual prompt will remain with an assigned verifier before returning, due to inaction on the part of the assigned verifier, to the schedule generator 206 for reassignment. For example, if a prompt is sent to a verifier and call timeout is set at five minutes, if the verifier does not take an action within that five minute period, the prompt will be reassigned to another verifier.

Screen timeout establishes a maximum period of time for which a screen may be inactive before the assigned verifier will be logged out. For example, if screen timeout is set at five minutes and the verifier has not taken any action during that period, the system will, at the end of five minutes, log the verifier out.

Call timeout as number of days controls the number of days that may elapse before a call awaiting verification will be sent to the quality assurance processor. This rule protects against the indefinite hold of a call that might otherwise occur due to incompatible rule settings. For example, if number of verifications were set at five, independent verification were selected, and there were only three verifiers, the criteria would never be met and verification of the call would never be completed.

Number of positive preliminary verifications establishes the minimum number of positive preliminary verifications required in order to output a positive final verification status to the customer database manager. As used in this patent, "Preliminary" verifications are defined to be those verifications output by the verifiers and sent to the quality assurance processor for review. A "final" verification status is that status output by the quality assurance processor to the customer database manager.

The number of positive preliminary verifications may be expressed as "the best X of Y", with X being the number of positive preliminary verifications and Y being the number of verifications. If, for example, X is set at "3" and Y is set at "5", three positive preliminary verifications out of five verifications would be sufficient to result in a positive final verification status. In the preferred embodiment of the present invention, the number of positive preliminary verifications matches the number of verifications.

Percentage of error controls the number of test entries to be intermingled with the valid response/sound file pairs. Percentage of error may be as high as 99%, meaning 99 out of 100 response/sound file pairs presented to a verifier are test entries. Such a high percentage of error may be appropriate during accelerated testing of a verifier suspected of forwarding invalid positive preliminary verifications to the quality assurance processor. During normal operation it is expected that percentage of error will be set at a significantly lower percentage level.

Rule settings in place during verification of a particular call are stored with a call identification tag identifying the particular call for later recall. It is then possible to review the rules as they were set when the particular call was verified for quality assurance or other purposes.

Once the rules are set, the most recent settings are stored in the TPV rules file as a default set of rules to be used as a starting point when setting up the next verification sequence. Rule settings are determined by a system supervisor and are not accessible to the verifiers.

The TPV management system further comprises a TPV user database 211 and a TPV dataset 203. The TPV user database 211 contains a record of all valid verifiers with individual verifier data such as language to be verified, last log-in time and date, etc. The TPV dataset 203 includes a TEMP database file 207, a TPV call file 209, a TPV prompt file 208, a TPV data file 210, a TPV work file 212, and a TPV error file 214.

The TEMP database file 207 receives a plurality of IVRMKT.TXT files from the response file 201. Each IVRMKT.TXT file has a plurality of fields which may include CALLID, SCRIPT, PNAME, PROMPT, SCTYPE and SOUNDFILE, including a pointer to the appropriate sound file. The TEMP database file 207 also receives a TELMKT.TXT file from the TPV IVR system 113 for each call. The TELMKT.TXT file contains a call ID and a script ID from the telemarketing user interface 106. The TEMP database file 207 tags the call ID from the TELMKT.TXT to the appropriate fields within the IVRMKT.TXT file such that each field in the IVRMKT.TXT file is tagged with the correct call ID. This creates a record of each call by field.

The TPV call file 209 contains a single record for each call that needs to be verified along with the rules associated with each call. After a call has been verified, the call is flagged. The flag serves as a cue to the quality assurance processor 118 to review that call verification. In the event the quality assurance processor determines re-verification to be required, the quality assurance processor removes the flag, effectively placing the call back into the pool of calls to be verified.

The TPV prompt file 208 contains a record for each sound file to be verified, i.e., each response within a customer's set of responses comprising a call is stored as a record. A particular record will be listed in the TPV prompt file 208 the number of times specified by the number of verifications rule. For example, if number of verifications is set at four, each record will be listed in the TPV prompt file 208 four times. A different grouping ID is associated with each record. After a record has been verified, the schedule generator writes the results of verification to the appropriate TPV prompt record. Results of verification include verifier identity and time of verification. These results are flagged for the quality assurance processor to review. In the event the quality assurance processor determines re-verification to be required, the quality assurance processor removes the flag, effectively placing the record back into the pool of records to be verified.

The TPV data file 210 stores data received from the telemarketing user interface that does not require verification.

The TPV work file 212 contains a listing of calls or prompts to be verified by a particular verifier and a record of the verifiers currently logged into the TPV management system 103. When an assigned call or prompt is verified, the results are returned to the schedule generator; the schedule generator 206 writes the results to TPV prompt 208. The TPV work file 212 then retrieves from the schedule generator 206 the next call or prompt to be verified and adds that call or prompt to the listing presented to the verifier.

The TPV error file 214 stores pending errors for a particular verifier or verifiers as input by the quality assurance processor 118. Pending errors identify a verifier as a suspect verifier. A suspect verifier is one who has generated a suspected or a known invalid positive preliminary verification of a response/sound file pair. Errors stored in the TPV error file 214 may accumulate until such time as the suspect verifier next logs in. Upon log in of the suspect verifier, the schedule generator 206, responsive to the stored errors, directs additional test entries to the suspect verifier. The number of test entries, relative to verifiable response/sound file pairs, presented to the suspect verifier is determined by the setting of the percentage of error rule.

Test entries are generated by test entry generating means, embodied in FIG. 2 as an error generator 213. The error generator 213 generates test entries, which are defined herein as non-matching response/sound file pairs, by scrambling a stored text file with a non-matching stored sound file. The valid response/sound file pairs are not destroyed. The test entries are retrieved by the schedule generator 206 for routine insertion in the test streams directed to the voice data verification module 119. These test entries may be inserted on a random, pseudorandom, periodic, or verifier-directed basis to the verifiers.

The schedule generator 206 schedules response/sound file pair verification, tracks results, and feeds the results to the quality assurance processor 118. Test streams including valid response/sound file pairs and test entries are sent from the schedule generator 206 to the voice data verification module 119. The voice data verification module 119 checks for new calls to be verified in the work file 212.

The quality assurance processor 118 monitors preliminary verification results from the verifiers and forwards final verification status to the customer database manager 101. If the final verification status is positive, the carrier 122 is notified to take the specified action.

One of the functions of the quality assurance processor is to provide a second opinion. A negative preliminary verification output by a verifier may be reassessed by the quality assurance processor. The quality assurance processor may determine there to be a match even though the initial verifier did not so determine. This is a reasonable outcome in view of the complicated nature of some of the customer's responses and the fact that these responses must be identified simply by listening to a voice clip.

A second function of the quality assurance processor is the initiation of accelerated testing. Accelerated testing is defined as the directing of an increased number of test entries to a suspect verifier. If it is suspected that a particular verifier is verifying all responses and not critically reviewing the responses, the quality assurance processor 118 sends an error message to the TPV error file 214. The schedule generator 206 checks the TPV error file 214 and, if the suspect verifier is logged in, proceeds with accelerated testing of the suspect verifier. In an accelerated testing scenario, a verifier may receive a large number of test entries, as controlled by the percentage of error rule. By definition, these test entries do not have a match between the text file and the corresponding voice clip. Accordingly, a verifier's positive preliminary verification in response to any one of such test entries is positive evidence that the verifier's output is not reliable and must be re-verified. Such a verifier may then be reprimanded, terminated, or subjected to other appropriate action.

The inclusion of test entries provides a powerful incentive to the verifiers to critically review their assigned responses. In that the verifiers never know when a test entry is being presented to them, they cannot simply pass responses through as verified without risk of being detected. Such a system makes it far less likely that a false authorization will be verified and, hence, far less likely that a customer will be subjected to an unwanted action, such as a long distance switch. With this increased verification reliability, customer complaints arising from unauthorized actions will be significantly reduced.

The system of the present invention may be implemented using a variety of computer equipment options as would be well known to persons of skill in the art. As an example only, the customer database manager and the TPV IVR system may be implemented with two NT™ servers installed with Foxpro™ software but alternative embodiments are included and intended within the present disclosure.

In use of the TPV system, letters of agency are input to the LOA database 105 where they are routed by LOA routing 112 according to whether or not they require verification. Letters of agency not requiring verification are sent to the pending database 111 and to the carriers 122. Letters of agency requiring verification go to the pending database 111 and to an STverify database 110 of telephone numbers.

The LOA database 105 compiles a plurality of telephone numbers for potential customers based on the LOA's. These telephone numbers, called ANI's for automatic number identification, go to the telemarketing user interface 106 for initial contact. If a predictive dialer is used, the predictive dialer 107 initiates dialing whenever a telemarketer is available or estimated to be available. Predictive dialers are well known in the art. When a potential customer answers the telephone responsive to the predictive dialer, the predictive dialer 107 connects the customer to the available telemarketer.

Once the predictive dialer has made a contact, the telemarketer is presented, on a computer screen, with file information on the potential customer being contacted. This file information includes whatever data was entered from the potential customer's LOA. If all data fields are completed, the telemarketer merely confirms the on-screen data with the potential customer. If some data fields are blank, the telemarketer can obtain that information during the telephone contact. The telemarketer creates a text file of the information; the text file is tagged with the telemarketer's identification number. Assuming the potential customer authorizes the action requested by the telemarketer, to change long distance service for example, the telemarketer establishes a first communications channel with the TPV IVR system 113 and sends the text file to the real-time customer information database 116 of the TPV IVR system 113 over the first communications channel. The first communications channel may be embodied as an ISDN link.

The telemarketer also establishes a second communications channel with the TPV IVR controller 112 to support the voice data exchange. The second communications channel may be embodied as a T1 telephone link. The T1 connection can support multiple phone connections. In the preferred embodiment the T1 connection supports 24 connections, but this is not required for or limiting to the invention.

Voice data received over the second communications channel is tagged with the telemarketer's identification number. The TPV IVR system matches the text file with the appropriate voice data using the telemarketer's identification number tags.

The telemarketer controls which script is called from the IVR script and prompt repository 115. The script and call identification is contained in the text file sent by the telemarketer and used by the TPV IVR system to run the script. The script and call identification may be included as an instruction or a code to the TPV IVR system. The telemarketer's identification number tag may also be used to identify the script that is to be played.

The telemarketer also controls the playing of the script. The telemarketer remains on the line in a conference calling arrangement during the presentation of the script to the customer and may speak to the customer or otherwise intervene at any time. After a script is started, the TPV IVR system continually checks for additional text files received from the telemarketer. If a file is located, the TPV IVR system reads the file and follows the instructions contained therein. For example, if the preamble and three questions have been played and the TPV IVR system locates a first file with instructions to pause, the TPV IVR controller will pause the script. The TPV IVR controller will then erase the first file and look for additional files. If a second file is located with instructions to restart the script beginning at the fourth question, the TPV IVR controller will implement those instructions, erase the second file, restart the script and continue to check for additional files. The telemarketer can also choose to terminate the script and abort the third party verification process at any stage.

The IVR script and prompt repository 115 may include any number of scripts for a variety of purposes and these scripts may be stored in any number of languages. As an example, the specified IVR script may begin with a preamble such as:

> Welcome to TPV's system for verifying changes in long distance service. Before TPV can authorize (long distance company) to become your new long distance carrier, I will need to ask you a few questions. If you would like a question repeated at any time, please press the star key on your telephone. If you would like to terminate this verification process, press 0. This call will be recorded or monitored.

Through the use of customized scripts, the present invention may be used to support any business requiring third party verification. Possible applications would include fund raising enterprises, credit or loan processing services, etc.

When the script has been completed, the telemarketer terminates the call with the customer. The customer's responses are recorded and stored in the IVR response repository 114 as a plurality of sound files.

Through this automated recording for subsequent verification, the present invention eliminates the need for a live verifier to be on-line with each customer for each telephone contact. The present invention also allows the verifiers to listen to answers only, freeing them from the wasted time of listening to questions. This greatly reduces the number of verifiers needed and enables these verifiers, who are working off-line and on a non-real-time basis, to realize significant gains in efficiency as one verifier is able to verify an exponentially greater number of calls per day than was possible in the prior art.

A verifier within the third party verification unit 102 thereafter verifies the responses, received as a text file from the telemarketing user interface 106, with the sound files recorded in the IVR response repository 114. This verification is accomplished using a voice data verification module 119. The text file to be verified, or a single prompt response within the text file, is presented to the verifier on a display. The verifier reads a response and listens to the sound file voice clip of the same response. If the verifier confirms that the database response entry matches the information in the sound file, the verifier forwards a positive preliminary verification output to the quality assurance processor 118. If the verifier does not think that the database response entry matches the sound file entry, the verifier forwards a negative preliminary verification output to the quality assurance processor 118.

In the preferred embodiment, if any one of the verifiers assigned to a set of responses corresponding to a particular customer output a negative preliminary verification, the original authorization given by the customer is not verified and the specified act is not performed. In the case of a long distance provider requesting authorization to change long distance service, for example, a negative preliminary verification from one verifier may, dependent on the rules generated, prevent such a long distance switch. If, on the other hand, all verifiers listening to a particular customer's responses output positive preliminary verification outputs to the quality assurance processor, the quality assurance processor 118 will, upon review, most likely send a positive final verification status back to the customer database manager 101 through a TPV file 120. In response to the positive final verification status, authorization to switch long distance service is sent to the carriers 122. The quality assurance processor 118 can, however, override the positive preliminary verification outputs and output a negative final verification status.

In the preferred embodiment, the quality assurance processor is set to monitor all preliminary verifications, whether positive or negative, and whether or not these preliminary verifications meet the criteria set by the rule generator for defining a valid verification of the customer's authorization. For example, if the number of positive preliminary verifications were set at four and the number of verifications set at five, and a particular call received four or five positive preliminary verifications, the quality assurance processor would still monitor this preliminary verification status and have the ability to override what would otherwise be a positive final verification status.

Alternatively, customer calls receiving 100% positive preliminary verifications from a plurality of verifiers could be allowed to bypass the quality assurance processor and pass directly to the customer database manager as a positive final verification status. This embodiment is not preferred, however, as the quality assurance function is very important to the validation of positive preliminary verifications from the verifiers. The receipt of 100% positive preliminary verifications does not necessarily mean that all verifiers were fully analyzing their entries sufficient to support that 100% outcome.

The quality assurance processor presents an on-screen listing of the verifiers by script response, including a record of which verifiers passed the script response and which verifiers failed the script response. When a preliminary verification is suspect, the quality assurance processor calls the error generator and initiates accelerated testing of the suspect verifier. During accelerated testing, the quality assurance processor controls the nature of the test entries directed to the voice data verification module for the suspect verifier, e.g., the script and the question, according to the assignment of the suspect verifier.

To further reduce the number of unauthorized actions, such as telephone long distance carrier switches for example, the switch 109 between the customer database manager 101 and the third party verification unit 102 may perform a telephone number confirmation function. The switch 109 may be used to transmit the telephone number, as actually dialed by the telemarketer, directly to the third party verification unit 102 through a TPV central processing unit. This direct transmission of the telephone number actually dialed serves to double-check that the telephone number reported by the telemarketer is indeed the telephone number that was dialed. With this double-check, there is confirmation that someone, albeit perhaps not an authorized person, was reached at the customer's telephone number. This double-check also replaces the element of conventional verification whereby the verifier dials the customer's telephone number directly, thereby eliminating the need to have a second call to the customer for verification and instead having a single call combine the telemarketing sale with simultaneous receipt of verification information.

Direct transmission of the telephone number as dialed to the third party verification unit 102 may also serve as the basis for increased verification requirements. If the telephone number provided by the customer as the number to be switched, for example, does not match the telephone number actually dialed, this may indicate a suspect situation where increased verification of the authorization to switch long distance service may be recommended.

The third party verification unit 102 may be used with a variety of customer database managers. The customer database manager instructs the third party verification unit 102, upon telephone connection with such unit, as to which scripts to use and what to record. As a result, any number of customer database managers may establish a connection with the third party verification unit and, by instructing the third party verification unit on the specific script to be used, accomplish a variety of verification tasks.

In an alternative embodiment of the present invention, the questions asked of the customer by the telemarketer may include patterned queries and nonpatterned queries. Patterned queries are defined to be those questions to which a yes or a no answer is appropriate. Patterned queries may also include those questions to which a number response is appropriate. Nonpatterned queries are those requiring a response that is essentially unique to the customer. Such responses would include the customer's name, address, mother's maiden name, etc. Responses to patterned queries are termed patterned responses. Responses to nonpatterned queries are termed nonpatterned responses.

In this embodiment, the IVR script directed to the customer also includes patterned and nonpatterned queries as necessary to correspond to the patterned and nonpatterned queries already asked of the customer by the telemarketer at the telemarketing user interface 106. As an example, a patterned query might be, "You have asked (long distance company) to provide long distance service to phone number XXX-XXX-XXXX. If this is correct, please say yes after the tone. If it is not, say no." As an example, a nonpatterned query might be, "After the tone, please state your first and last name, as it appears on your phone bill."

The plurality of patterned responses provided to the telemarketer and sent to the TPV IVR system 113 as a text file are compared by a voice recognition processor with the plurality of patterned responses recorded at the TPV IVR system 113 and stored in the IVR response repository 114. The patterned responses may be any percentage of the total responses, dependent on the information needed. Assume, for example, that ten questions are asked of the customer during the initial interview and thereafter by the TPV IVR system controller 112, of which require patterned responses. In this example, the voice recognition processor can process over fifty percent of the customer's responses, thereby reducing considerably the time required by a live verifier to verify the remaining four customer responses with the voice data verification module.

As an alternative automated verification option, the scripted queries directed to the customer by the TPV IVR controller 112 may ask the customer to spell out the customer's responses. A voice recognition processor within the TPV management system 103 could then be used to verify all customer responses.

By partially automating the third party verification process, combined with monitored live verification, or through full automation of the verification process, the alternative embodiments of the present invention, like the preferred embodiment, provide a higher degree of accuracy, resulting in fewer customer complaints and reduced verification costs.

The TPV system of the present invention may also be embodied as the third party verification unit 102 in conjunction with data input from a source other than a customer database manager and/or telemarketing user interface. In this embodiment, the TPV unit receives data to be verified from a first data source, and solicits the same data from a second data source. Once data has been received from the first and second data sources, the TPV management system proceeds with the verification process as in the preferred embodiment. As in the preferred embodiment, verification may occur closely or distantly in time, with the length of a delay before verification limited only by the usefulness of the verification and/or the verified data after such delay.

More specifically, the present invention may be embodied as a third party verification (TPV) unit for verifying data received from a first data source with data received from a second data source. The first data source may be a telemarketing user interface or other data gathering interface. The first data source may be an individual, a service provider, or any other entity requiring or desiring third party verification of information. The second data source may be a customer who provided the information to the first data source. The second data source may also be an employer, an associate, a creditor or credit agency, a lender, a borrower, a reference or virtually any other entity having some sort of relationship with or knowledge of the information to be verified.

The TPV unit includes a third party verification (TPV) interactive voice response (IVR) system and a third party verification (TPV) management system. The third party TPV IVR system includes a TPV IVR controller, a real-time information database, an interactive voice response (IVR) script and prompt repository, and an IVR response repository. The TPV management system includes a controller, a voice data verification module, and a quality assurance processor.

The real-time information database receives a first set of data from the first data source. The first set of data may be formatted as a text file. Alternatively, the first set of data may be formatted in some other format. The interactive voice response (IVR) script and prompt repository is coupled to an output of the real-time information database and stores a plurality of scripts. In response to an instruction or code received with the first set of data, the TPV IVR controller selects a particular script and directs that script to the second data source. The second data source, in response to the particular script, directs a second set of data to the IVR response repository. The IVR response repository stores the second set of data. The second set of data may be formatted as a voice clip or sound file, or may be in some other format.

The controller within the third party verification (TPV) management system correlates the first set of data and the second set of data. To correlate the first set of data and the second set of data, the controller identifies a particular entry within the first set of data and then identifies, within the second set of data, the entry corresponding by subject matter and/or sequence to the particular entry within the first set of data. This correspondence is based on the script directed to the second data source. The script solicits, from the second data source, information intended to mirror the information already received from the first data source. If a positive third party verification is to be made, each entry within the first set of data must match its corresponding entry within the second set of data. If entries that should match do not match, then the third party verification status is negative, i.e., the first set of data is not verified.

The voice data verification module, coupled to the controller, conducts the third party verification by processing the first set of data and the second set of data to verify a match between each of the plurality of entries within the first set of data and each of the corresponding plurality of entries within the second set of data. By way of example, it will be assumed that the first set of data is formatted as a text file while the second set of data is formatted as a plurality of voice clips or sound files. The voice data verification module presents, on a display, a first textual entry from the first set of data. A verifier using the voice data verification module reads the first textual entry and then initiates the playing of the corresponding voice clip entry from the second set of data. If the voice clip sounds like it would appear the written text would sound if spoken, the verifier outputs a positive preliminary verification. If the voice clip does not sound like it would appear the written text would sound if spoken, the verifier outputs a negative preliminary verification. In either event, the voice data verification module sends the preliminary verification status to the controller.

As a variation on this embodiment, or to the preferred embodiment, the verifier can listen to the voice clip and then type what was heard. The voice data verification module then compares the typed entry with the corresponding entry from the text file to reach a positive or a negative preliminary verification status. This embodiment is not preferred, however, in view of the difficulty in matching variable spellings of what would sound like the same entry.

The quality assurance processor, coupled to the controller, monitors the preliminary verification status. The quality assurance processor may confirm the preliminary verification status or override the preliminary verification status to obtain an opposite verification result. The quality assurance processor may also request re-verification or additional verifications by a plurality of verifiers. The quality assurance processor then transmits the final verification status to the first data source.

As in the preferred embodiment the third party verification (TPV) unit further comprises test entry generating means coupled to the controller and to the quality assurance processor. The test entry generating means generates test entries. Each test entry includes a non-correlated entry from the first set of data and a non-correlated entry from the second set of data. By non-correlated it is meant that the entry selected from the first set of data is paired with a non-corresponding entry from the second set of data.

The controller inputs test entries to the voice data verification module. In response to a suspect match verification by a verifier using the voice data verification module, the quality assurance processor directs the controller to accelerate the input of test entries to the voice data verification module for that verifier. With the accelerated input of test entries, the odds are greatly increased that a verifier who is not performing adequately will be detected. In the event the suspect verifier outputs a positive preliminary verification of even one test entry, the quality assurance processor will detect a known incorrect match verification and will direct re-verification of the entries originally presented to the suspect verifier.

The present invention also provides a method for verifying a customer's telephone authorization to a service provider to take a specified action using a third party verification system. The third party verification system includes a customer database manager, a TPV IVR system and a TPV management system having a controller, a voice data verification module, and a quality assurance processor.

The method comprises the steps of initiating, by a telemarketer at a telemarketing user interface of the customer database manager, a telephone contact with the customer to request authorization to take a specified action. If the customer authorizes the specified action, the telemarketing user interface directs a plurality of queries to the customer. Alternatively, the telemarketer may confirm customer data already on file.

In response to the plurality of queries, the customer provides a first plurality of responses. The telemarketing user interface generates a text file with the first plurality of responses, and establishes a communications link with the TPV IVR system using a first communications channel and a second communications channel.

The method then comprises the steps of transmitting over the first communications channel, from the customer database manager to the TPV IVR system, the text file and directing, by the TPV IVR system, a plurality of scripted queries to the customer over the second communications channel. The plurality of scripted queries corresponds to the plurality of queries, respectively. The customer, responsive to the plurality of scripted queries, provides a second plurality of responses to the TPV IVR system. The TPV IVR system records as voice clips the second plurality of responses as a plurality of sound files.

The TPV management system controller correlates the first plurality of responses with a corresponding plurality of sound files to generate a plurality of response/sound file pairs. The TPV management system voice data verification module verifies the plurality of response/sound file pairs. The quality assurance processor monitors a plurality of preliminary verifications of the plurality of response/sound file pairs and transmits a final verification status of the customer's telephone authorization to the customer database manager.

To increase verification reliability, the method further includes steps for testing the verification process using a plurality of test entries. Each of the plurality of test entries includes a non-matching response and sound file pairing.

Figure 3:
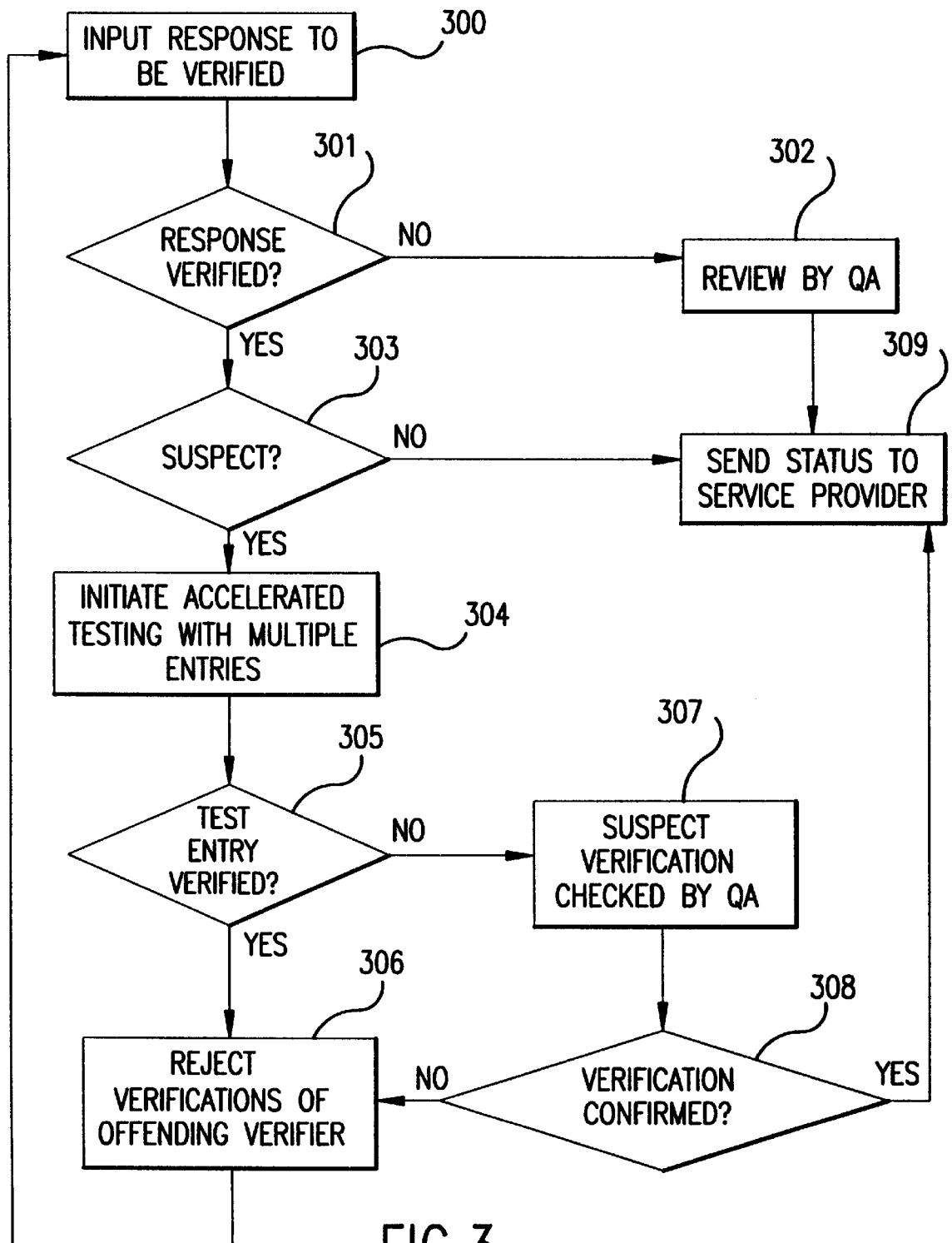
FIG. 3 is a flowchart of the steps taken by the quality assurance processor in monitoring the verification process.

As set forth in FIG. 3, responses to be verified are input 300 to the voice data verification module. The plurality of test entries are input to the voice data verification module, along with the responses, on a random, pseudo-random, periodic or verifier-directed basis.

If a response is not verified 301, the negative verification is reviewed 302 by the quality assurance processor. The quality assurance processor sends 309 final verification status to the service provider. If a response is verified 301, the quality assurance processor determines if the verification is suspect 303. If the verification is not suspect 303, a positive final verification status is sent 309 to the service provider. If the verification is suspect 303, the quality assurance processor accelerates 304 the input of test entries to the voice data verification module. The quality assurance processor monitors the verification output of the suspect verifier responsive to the accelerated appearance of test entries. If the suspect verifier verifies 305 at least one of the plurality of test entries, the quality assurance processor records a known incorrect match verification to confirm that the verifier is not performing adequately. The verifications of the offending verifier are rejected 306 and the response is input 300 for re-verification.

If the suspect verifier does not verify 305 any of the test entries, the suspect verification is checked 307 by the quality assurance processor. If the validity of the suspect verification is confirmed 308, a positive final verification status is sent 309 to the service provider. If the validity of the suspect verification is not confirmed 308, the verifications of the offending verifier are rejected 306 and further investigation may be initiated or corrective measures taken. The response is input 300 for re-verification.

In an alternative embodiment, the plurality of queries may include a first plurality of patterned queries and a first plurality of nonpatterned queries. Patterned queries are defined to be those questions to which a yes or a no answer is appropriate. Patterned queries may also include those questions to which a number response is appropriate. Nonpatterned queries are those requiring a response that is essentially unique to the customer. Such responses would include the customer's name, address, mother's maiden name, etc. The plurality of scripted queries further include a second plurality of patterned queries and a second plurality of nonpatterned queries as necessary to correspond to the queries generated by the telemarketer.

In response to the patterned and nonpatterned queries, the first plurality of responses includes a first plurality of patterned responses and a first plurality of nonpatterned responses. Responses to patterned queries are termed patterned responses. Responses to nonpatterned queries are termed nonpatterned responses. Similarly, the second plurality of responses include a second plurality of patterned responses and a second plurality of nonpatterned responses.

The step of verifying the first plurality of patterned responses includes the steps of comparing, using a voice recognition processor, the first plurality of patterned responses as set forth in the text file to the second plurality of patterned responses recorded by the TPV IVR system. In response to the first plurality of responses matching the second plurality of patterned responses, respectively, a positive preliminary verification is output to the quality assurance processor. In response to any of the first plurality of responses being different from a corresponding response within the second plurality of patterned responses, a negative preliminary verification is output to the quality assurance processor.

The step of verifying the first plurality of nonpatterned responses includes the steps of comparing, by a verifier using a voice data verification module, the first plurality of nonpatterned responses as set forth in the text file to the second plurality of nonpatterned responses recorded by the TPV IVR system as is done in the preferred embodiment. In response to the first plurality of nonpatterned responses matching the second plurality of nonpatterned responses, respectively, a positive preliminary verification is output to the quality assurance processor. In response to any of the first plurality of nonpatterned responses being different from a corresponding response within the second plurality of nonpatterned responses, a negative preliminary verification is output to the quality assurance processor.

In the preferred embodiment, preliminary verification is performed by a plurality of verifiers. Accordingly, in the preferred embodiment the step of verifying the plurality of response/sound file pairs includes the steps of sending a first response/sound file pair to a first verifier. The first verifier compares a text of the first response to a corresponding voice clip of the first sound file. In response to the first response matching the first sound file, a first positive preliminary verification is output to the quality assurance processor. In response to the first response being different from the first sound file, a first negative preliminary verification is output to the quality assurance processor.

The method further comprises the steps of sending a second response/sound file pair to a second verifier. The second verifier compares a text of the second response to a corresponding voice clip of the second sound file. In response to the second response matching the second sound file, a second positive preliminary verification is output to the quality assurance processor. In response to the second response being different from the second sound file, a second negative preliminary verification is output to the quality assurance processor.

The method further comprises the steps of sending each of the remaining response/sound file pairs to a corresponding number of verifiers, with the number of verifiers designated as "n". The method comprises the steps of sending an nth response/sound file pair to an nth verifier. The nth verifier compares a text of the nth response to a corresponding voice clip of the nth sound file. In response to the nth response matching the nth sound file, an nth positive preliminary verification is output to the quality assurance processor. In response to the nth response being different from the nth sound file, an nth negative preliminary verification is output to the quality assurance processor.

Once all responses are verified, the quality assurance processor reviews the preliminary verification status and transmits final verification status to the customer database manager. Responsive to receiving any of the first negative preliminary verification, the second negative preliminary verification, and the nth negative preliminary verification, a negative final verification status, e.g., a denial of telephone authorization verification, is sent to the customer database manager. Responsive to receiving all of the first positive preliminary verification, the second positive preliminary verification, and the nth positive preliminary verification, a positive final verification status, e.g., verification of the customer's telephone authorization, is sent to the customer database manager. As discussed earlier in this document, the number of positive preliminary verifications required, as well as a level of tolerance for negative preliminary verifications is variable as determined by the rules set by the rules generator.

The method of the preferred embodiment may further comprise the steps of sending each of the responses to a plurality of verifiers for multiple preliminary verification. For example, the first response/sound file pair may also be sent to the second verifier and to the nth verifier. Similarly, the second response/sound file pair may also be sent to the first verifier and to the nth verifier, and the nth response/sound pair may also be sent to the first verifier and to the second verifier. With a plurality of verifiers verifying each response/sound file pair, even greater reliability in preliminary verification output may be realized.

The present invention may also be embodied as a method for verifying, using a third party verification unit, a first set of data received from a first data source with a second set of data received from a second data source. The third party verification unit includes a third party verification (TPV) interactive voice response (IVR) system and a third party verification (TPV) management system. The TPV IVR system includes a TPV IVR controller, a real-time information database, an interactive voice response (IVR) script and prompt repository, and an IVR response repository. The TPV management system includes a controller, a voice data verification module and a quality assurance processor.

The method comprises the steps of receiving, by the realtime information database, a first set of data from the first data source. The first set of data includes a plurality of entries and an instruction, code or other identifier for the TPV IVR unit. In response to the instruction, a first script is selected from a plurality of scripts stored in the IVR script and prompt repository. The TPV IVR controller directs the first script to the second data source. In response to the first script, the second data source provides a second set of data to the TPV IVR unit. The second set of data includes a plurality of entries. Each entry in the second set of data has a corresponding entry in the first set of data. The IVR response repository records the second set of data.

The controller correlates the plurality of entries within the first set of data with the corresponding plurality of entries within the second set of data to generate a plurality of correlated pairs of data. A correlated pair of data is a combination of a particular entry from the first set of data with the corresponding entry from the second set of data. The controller inputs the plurality of correlated pairs of data to the voice data verification module for preliminary verification. The voice data verification module verifies the plurality of correlated pairs of data to generate a preliminary verification status and outputs the preliminary verification status to the controller. The quality assurance processor monitors the preliminary verification status and either confirms or overrides the preliminary verification status to generate a final verification status. The quality assurance processor then transmits the final verification status to the first data source.

As in the preferred embodiment, the method may further comprise the steps of generating, by test entry generating means, a plurality of test entries. Each test entry represents a noncorrelated pair of data including a nonmatching entry from the first set of data and a nonmatching entry from the second set of data. The controller inputs the plurality of test entries with the plurality of correlated pairs of data to the voice data verification module on a random, pseudo-random, periodic or verifier-directed basis. In response to a suspect preliminary verification by an identified verifier, the quality assurance processor initiates accelerated input of test entries to the voice data verification module on a verifier-directed basis for the identified verifier. The quality assurance processor monitors the preliminary verification status output by the identified verifier responsive to the accelerated input of test entries. In response to a positive preliminary verification of at least one of the plurality of test entries, the quality assurance processor identifies a known invalid preliminary verification. The quality assurance processor then directs the plurality of correlated pairs of data back to the voice data verification module for re-verification by a second verifier or by a plurality of verifiers.

It will be apparent to those skilled in the art that various modifications can be made to the third party verification system and method of the instant invention without departing from the scope or spirit of the invention, and it is intended that the present invention cover such modifications and variations provided they come within the scope of the appended claims and their equivalents.

We claim:

1. A third party verification system for verifying a customer's authorization to a service provider to perform a specified act, the system comprising:

a customer database manager having a telemarketing user interface for contacting a customer at a telephone number and initiating a series of questions, said telemarketing user interface, responsive to response information provided by the customer, for creating a text file of the response information and initiating third party verification;

a third party verification (TPV) interactive voice response (IVR) system, coupled to said telemarketing user interface through a first communications channel and a second communications channel, for receiving, responsive to initiation of third party verification, the text file over the first communications channel, for sending a plurality of scripted queries over the second communications channel to the customer, and for recording a plurality of responses to the plurality of scripted queries as a plurality of sound files, respectively; and a third party verification management system including,
 a controller, coupled to said TPV IVR system, for correlating the text file with the plurality of sound files and for controlling a third party verification;
 a voice data verification module, coupled to the controller, for processing the plurality of sound files with the text file to verify a match between each of the plurality of responses within the text file and each of the plurality of sound files, and for sending preliminary verification status to the controller; and
 a quality assurance processor, coupled to said controller, for monitoring the preliminary verification status and for transmitting a final verification status to said customer database manager.

2. The third party verification system as set forth in claim 1, further comprising:

test entry generating means, coupled to said controller and to said quality assurance processor, for generating test entries, each test entry including a nonmatching response and sound file pairing;

said controller inputting test entries to the voice data verification module and, responsive to a suspect preliminary verification by a verifier using the voice data verification module, for accelerating the input of test entries to the verifier through the voice data verification module to detect known incorrect preliminary verifications.

3. The third party verification system as set forth in claim 1, said TPV IVR system comprising:

a real-time customer information database, coupled to the telemarketing user interface through the first communications channel, for receiving the text file from the telemarketing user interface;

an interactive voice response (IVR) script and prompt repository, coupled to the telemarketing user interface and to the customer through the second communications channel, for storing a plurality of scripts and for directing, responsive to a code from the telemarketing user interface, a particular script to the customer; and an IVR response repository for storing a plurality of responses, received from the customer responsive to the particular script, as the plurality of sound files.

4. The third party verification system as set forth in claim 1, said controller comprising:

schedule generating means, coupled to said TPV IVR system, for scheduling the third party verification, tracking results, and feeding the results to the quality assurance processor; and rule generating means for establishing a set of rules governing the third party verification and for storing the set of rules for a next third party verification.

5. The third party verification system as set forth in claim 1, further comprising:

a plurality of voice data verification modules for processing a plurality of text files, each of said plurality of text files having a corresponding plurality of sound files, each of said plurality of voice data verification modules assigned a specific response.

6. The third party verification system as set forth in claim 1, said voice data verification module further comprising:

a plurality of verifier interfaces, each of said plurality of verifier interfaces assigned to a specified verifier, each of said plurality of verifier interfaces changeably assigned a specific response category within the text file.

7. The system as set forth in claim 1 with the customer being a telephone service subscriber and the specified act being a switch in the telephone service subscriber's long distance telephone carrier.

8. The third party verification system as set forth in claim 1, further comprising:

a switch, coupled between said telemarketing user interface and said TPV IVR system, for transmitting the telephone number, as actually dialed by said telemarketing user interface, directly to said TPV IVR system.

9. The third party verification system as set forth in claim 8, wherein one of the plurality of scripted queries requests the telephone number of the customer, the telephone number provided by the customer as a response being compared to the telephone number received over said switch, a discrepancy between the response and the telephone number received over said switch triggering increased verification requirements.

10. A third party verification (TPV) unit for verifying data received from a first data source with data received from a second data source, the TPV unit comprising:

a third party verification (TPV) interactive voice response (IVR) system including,
 a real-time information database for receiving a first set of data and an instruction from the first data source;
 an interactive voice response (IVR) script and prompt repository, coupled to an output of said real-time information database, for storing a plurality of scripts and for directing, responsive to the instruction, a particular script to the second data source; and
 an IVR response repository for receiving, responsive to the particular script, a second set of data from the second data source, and for storing the second set of data; and a third party verification (TPV) management system including, a controller, coupled to said TPV IVR system, for correlating the first set of data and the second set of data, and for controlling a third party verification;

a voice data verification module, coupled to the controller, for conducting the third party verification by processing the first set of data and the second set of data to verify a match between each of a plurality of entries within the first set of data and each of a corresponding plurality of entries within the second set of data, and for sending verification status to the controller; and a quality assurance processor, coupled to said controller, for monitoring verification status and for transmitting verification status to the first data source.

11. The third party verification (TPV) unit as set forth in claim 10, with the first data source including a telemarketing user interface and the second data source including a customer.

12. The third party verification (TPV) unit as set forth in claim 11, wherein the first set of data is received as a textual database entry and the second set of data is received as voice information to be recorded as a plurality of VOX files.

13. The third party verification (TPV) unit as set forth in claim 10, further comprising:

test entry generating means, coupled to said controller and to said quality assurance processor, for generating test entries, each test entry including a non-correlated entry from the first set of data and a non-correlated entry from the second set of data;

said controller inputting test entries to the voice data verification module and, responsive to a suspect match verification by a verifier using the voice data verification module, for accelerating the input of test entries to the voice data verification module to detect known incorrect match verifications by the verifier.

14. The third party verification (TPV) unit as set forth in claim 10, said controller comprising:

a schedule generator, coupled to said TPV IVR system, for scheduling the third party verification, for tracking results, and for feeding the results to the quality assurance processor; and a rule generator for establishing a set of rules governing the third party verification and for storing the set of rules as a default rule set for a next third party verification.

15. A method for verifying, using a third party verification system, a customer's telephone authorization to take a specified action, the third party verification system including a customer database manager having a telemarketing user interface, a TPV IVR system, and a TPV management system, the TPV management system having a controller, a voice data verification module, and a quality assurance processor, the method comprising the steps of:

initiating, by the telemarketing user interface, a contact with the customer to request authorization for a specified action;

authorizing, by the customer, responsive to the telemarketing user interface, the specified action;

directing, by the telemarketing user interface, responsive to the customer's authorization, a plurality of queries to the customer;

providing, by the customer, responsive to the plurality of queries, a first plurality of responses to the telemarketing user interface;

generating, by the telemarketing user interface, a text file with the first plurality of responses;

establishing, by the telemarketing user interface, a first communications channel and a second communications channel with the TPV IVR system;

transmitting, over the first communications channel, the text file from the telemarketing user interface to the TPV IVR system;

directing, by the TPV IVR system, a plurality of scripted queries over the second communications channel to the customer, the plurality of scripted queries corresponding to the plurality of queries, respectively;

providing, by the customer, responsive to the plurality of scripted queries, a second plurality of responses to the TPV IVR system;

recording, by the TPV IVR system, the second plurality of responses as a plurality of sound files;

correlating, by the controller, the first plurality of responses with the corresponding plurality of sound files, respectively, to create a plurality of response/sound file pairs;

inputting the plurality of response/sound file pairs to the voice data verification module;

verifying, by a verifier using the voice data verification module, the plurality of response/sound file pairs;

monitoring, by the quality assurance processor, a plurality of preliminary verifications of the plurality of response/sound file pairs by the verifier; and transmitting, from the quality assurance processor to the customer database manager, a final verification status of the customer's telephone authorization.

16. The method as set forth in claim 15, further comprising, after the step of correlating, the steps of:

generating, by test entry generating means, a plurality of test entries, each test entry including a non-matching response and sound file pairing; and inputting, by the controller, with the plurality of response/sound file pairs, the plurality of test entries to the voice data verification module.

17. The method as set forth in claim 16, the step of monitoring including the steps of:

accelerating, responsive to a suspect preliminary verification of a response/sound file pair by the verifier, the input of the plurality of test entries to the verifier through the voice data verification module;

monitoring, by the quality assurance processor, a preliminary verification output of the verifier responsive to the accelerated input of the plurality of test entries;

identifying, responsive to a positive preliminary verification of at least one of the plurality of test entries, a known invalid preliminary verification by the verifier.

18. The method as set forth in claim 15 with the customer being a telephone service subscriber and the specified action being the telephone service subscriber's authorization to switch the telephone service subscriber's long distance telephone carrier.

19. The method as set forth in claim 15, the step of verifying including the steps of:

comparing a text of a first response as set forth in the text file with a corresponding voice clip of a first sound file as recorded by the TPV IVR system;

outputting, responsive to the text matching the voice clip, a positive preliminary verification output; and outputting, responsive to the text being different from the voice clip, a negative preliminary verification output.

20. The method as set forth in claim 15, the step of verifying including the steps of:

sending a first response/sound file pair to a first verifier interface, the first response/sound file pair including a first response and a first sound file;

comparing, by a first verifier, a text of the first response to a corresponding voice clip of the first sound file;

outputting, responsive to the first response matching the first sound file, a first positive preliminary verification to the quality assurance processor;

outputting, responsive to the first response being different from the first sound file, a first negative preliminary verification to the quality assurance processor;

sending a second response/sound file pair to a second verifier interface, the second response/sound file pair including a second response and a second sound file;

comparing, by a second verifier, a text of the second response to a corresponding voice clip of the second sound file;

outputting, responsive to the second response matching the second sound file, a second positive preliminary verification to the quality assurance processor;

outputting, responsive to the second response being different from the second sound file, a second negative preliminary verification to the quality assurance processor;

sending an nth response/sound file pair to an nth verifier interface, the nth response/sound file pair including an nth response and an nth sound file;

comparing, by an nth verifier, a text of the nth response to a corresponding voice clip of the nth sound file;

outputting, responsive to the nth response matching the nth sound file, an nth positive preliminary verification to the quality assurance processor;

outputting, responsive to the nth response being different from the nth sound file an nth negative preliminary verification to the quality assurance processor;

transmitting, from the quality assurance processor to the customer database manager, responsive to receiving any of the first negative preliminary verification, the second negative preliminary verification, and the nth negative preliminary verification, a negative final verification status of the customer's telephone authorization; and transmitting, from the quality assurance processor to the customer database manager, responsive to receiving all of the first positive preliminary verification, the second positive preliminary verification, and the nth positive preliminary verification, a positive final verification status of the customer's telephone authorization.

21. The method as set forth in claim 20, further comprising the steps of:

sending the first response/sound file pair to the second verifier interface;

comparing, by the second verifier, the text of the first response to the corresponding voice clip of the first sound file;

outputting, responsive to the first response matching the first sound file, a third positive preliminary verification to the quality assurance processor;

outputting, responsive to the first response being different from the first sound file, a third negative preliminary verification to the quality assurance processor;

sending the second response/sound file pair to the nth verifier interface;

comparing, by the nth verifier, the text of the second response to the corresponding voice clip of the second sound file;

outputting, responsive to the second response matching the second sound file, a fourth positive preliminary verification to the quality assurance processor;

outputting, responsive to the second response being different from the second sound file, a fourth negative preliminary verification to the quality assurance processor;

sending the nth response/sound file pair to the first verifier interface;

comparing by the first verifier, the text of the nth response to the corresponding voice clip of the nth sound file;

outputting, responsive to the nth response matching the nth sound file, a fifth positive preliminary verification to the quality assurance processor;

outputting, responsive to the nth response being different from the nth sound file, a fifth negative preliminary verification to the quality assurance processor;

transmitting, from the quality assurance processor to the customer database manager, responsive to receiving a specified number of positive preliminary verifications, a positive final verification of the customer's telephone authorization.

22. The method as set forth in claim 20, further comprising the steps of:

sending the first response/sound file pair to the nth verifier interface;

comparing, by the nth verifier, the text of the first response to the corresponding voice clip of the first sound file;

outputting, responsive to the first response matching the first sound file, a sixth positive preliminary verification to the quality assurance processor;

outputting, responsive to the first response being different from the first sound file, a sixth negative preliminary verification to the quality assurance processor;

sending the second response/sound file pair to the first verifier interface;

comparing, by the first verifier, the text of the second response to the corresponding voice clip of the second sound file;

outputting, responsive to the second response matching the second sound file, a seventh positive preliminary verification to the quality assurance processor;

outputting, responsive to the second response being different from the second sound file, a seventh negative preliminary verification to the quality assurance processor;

sending the nth response/sound file pair to the second verifier interface;

comparing, by the second verifier, the text of the nth response to the corresponding voice clip of the nth sound file;

outputting, responsive to the nth response matching the nth sound file, an eighth positive preliminary verification to the quality assurance processor;

outputting, responsive to the nth response being different from the nth sound file, an eighth negative preliminary verification to the quality assurance processor;

transmitting, from the quality assurance processor to the customer database manager, responsive to receiving a specified number of positive preliminary verifications, a positive final verification of the customer's telephone authorization.

23. A method for verifying, using a third party verification unit, a first set of data received from a first data source with a second set of data received from a second data source, the third party verification unit including a third party verification (TPV) interactive voice response (IVR) system and a third party verification (TPV) management system, said TPV IVR system having a TPV IVR controller, a real-time information database, an interactive voice response (IVR) script and prompt repository, and an IVR response repository, said TPV management system having a controller, a voice data verification module and a quality assurance processor, the method comprising the steps of:

receiving, from the first data source, a first set of data by said real-time information database, the first set of data including an instruction;

selecting, responsive to the instruction, a first script from a plurality of scripts stored in said IVR script and prompt repository;

directing, by said TPV IVR controller, the first script to the second data source;

receiving, from the second data source, responsive to the first script, a second set of data;

recording, by said IVR response repository, the second set of data;

correlating, by said controller, a plurality of entries within the first set of data with a corresponding plurality of entries within the second set of data to generate a plurality of correlated pairs of data;

inputting the plurality of correlated pairs of data to said voice data verification module;

verifying, by said voice data verification module, the plurality of correlated pairs of data to generate a preliminary verification status;

outputting the preliminary verification status to said controller;

monitoring, by said quality assurance processor, the preliminary verification status; and transmitting, from said quality assurance processor to the first data source, a final verification status.

24. The method as set forth in claim 23, further comprising, after the step of correlating, the steps of:

generating, by test entry generating means, a plurality of test entries, each test entry representing a noncorrelated pair of data including a nonmatching entry from the first set of data and a nonmatching entry from the second set of data; and inputting, by said controller, the plurality of test entries with the plurality of correlated pairs of data to said voice data verification module.

25. The method as set forth in claim 24, the step of monitoring including the steps of:

accelerating, responsive to a suspect preliminary verification by a verifier, the input of the plurality of test entries to said voice data verification module for the verifier;

monitoring, by said quality assurance processor, a preliminary verification status output by the verifier responsive to the accelerated input of the plurality of test entries;

identifying, responsive to a positive preliminary verification of at least one of the plurality of test entries, a known invalid preliminary verification; and directing, by said quality assurance processor, the plurality of correlated pairs of data back to said voice data verification module for re-verification by a second verifier.

* * * * *